June 19, 1923.

C. L. FITZ

SIGNAL

Filed Jan. 20, 1923  2 Sheets-Sheet 1

1,459,586

C. L. Fitz  INVENTOR
BY Victor J. Evans  ATTORNEY

WITNESSES

June 19, 1923.

C. L. FITZ

SIGNAL

Filed Jan. 20, 1923

C. L. Fitz INVENTOR
BY Victor J. Evans
ATTORNEY

WITNESSES

Patented June 19, 1923.

1,459,586

UNITED STATES PATENT OFFICE.

CHARLES LEO FITZ, OF FOND DU LAC, WISCONSIN.

SIGNAL.

Application filed January 20, 1923. Serial No. 613,980.

*To all whom it may concern:*

Be it known that I, CHARLES LEO FITZ, a citizen of the United States, residing at Fond du Lac, in the county of Fond du Lac and State of Wisconsin, have invented new and useful Improvements in Signals, of which the following is a specification.

This invention comprehends the provision of a signal designed for use in connection with automobile wheels, and automatically operable by the escape of air from the tire, when the air in the tire reaches a predetermined low pressure, incident to a puncture, a slow leak in the tire or valve or from any other cause thereby informing the driver of the vehicle of the deflated condition of the tires, so that he may have it repaired before serious damage is done to the tire by the rim of the wheel.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
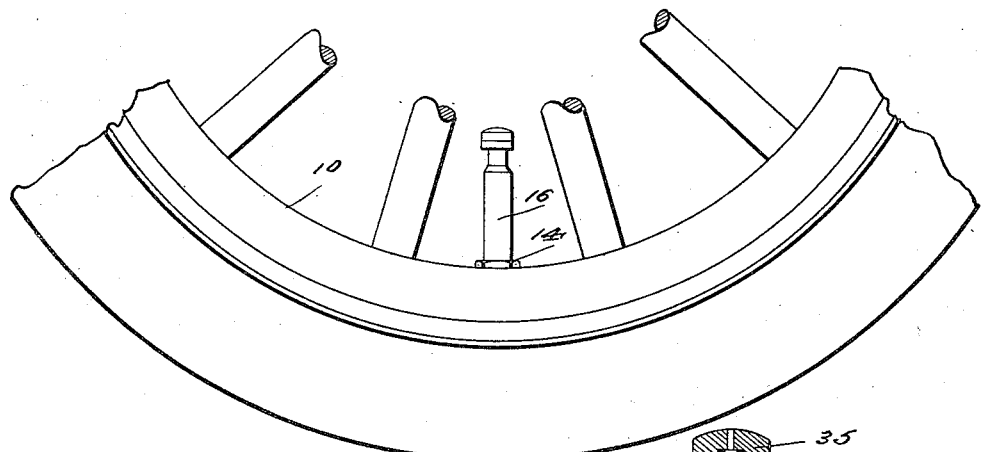
Figure 1 is a fragmentary view of the wheel showing the signal associated therewith.

Referring to the drawing in detail 10 indicates the felly of a wheel through which projects the usual valve casing 11, in which is arranged the valve 12 of well known construction, the stem of this valve being indicated at 13. Surrounding the casing 11 is the usual nut 14 which is threaded on the casing, bearing against the felly and formed with a tubular threaded portion 15.

Figures 2, 3:
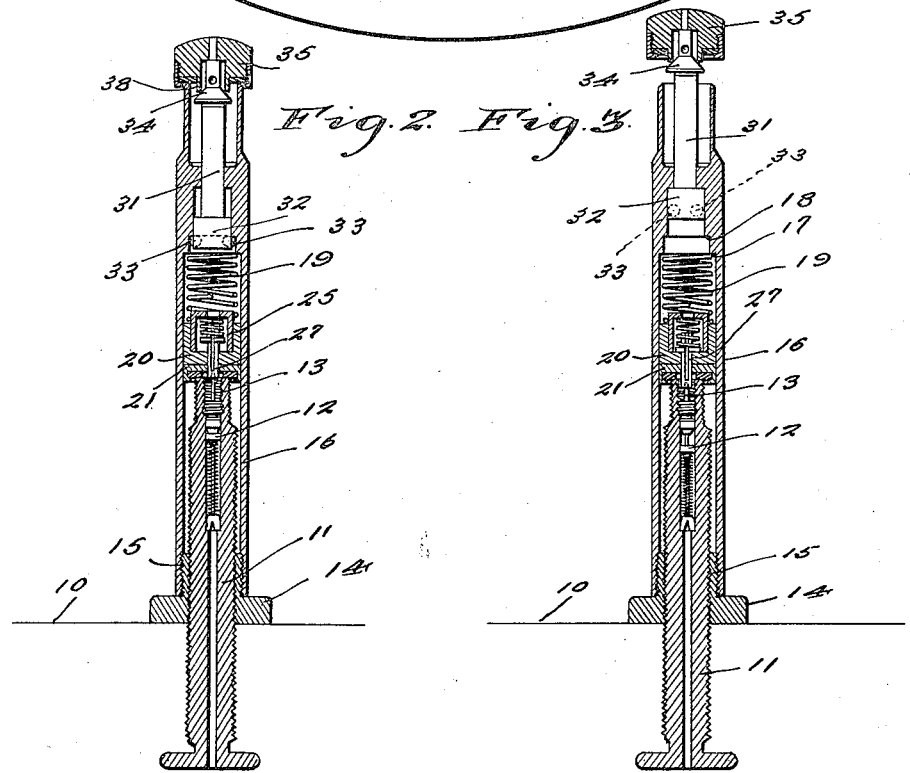
Figure 2 is a vertical sectional view through the signal and valve stem of the tire showing the parts in normal position.
Figure 3 is a similar view showing the active position of the parts.
Figure 4:
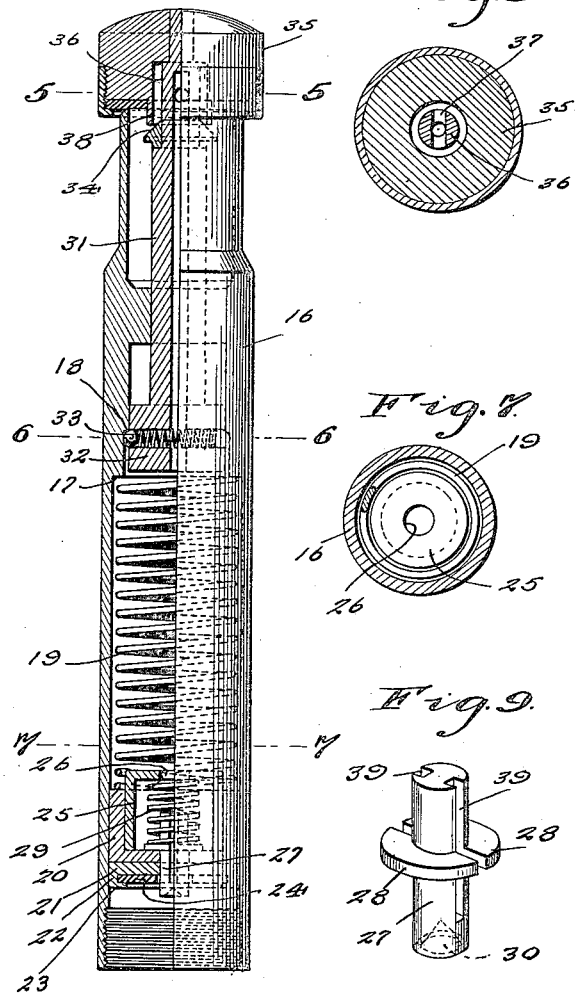
Figure 4 is an enlarged view in elevation of the signal partly in section.
Figure 5:
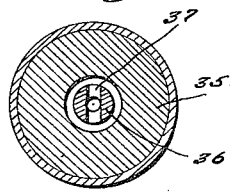
Figure 5 is a sectional view taken on the line 5—5 of Figure 4.
Figure 6:
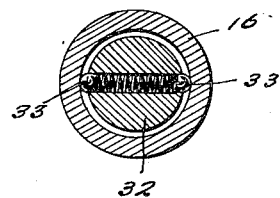
Figure 6 is a sectional view taken on the line 6—6 of Figure 4.
Figure 7:
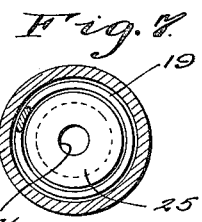
Figure 7 is a sectional view taken on the line 7—7 of Figure 4.
Figure 9:
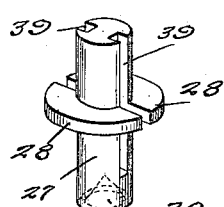
Figure 9 is a detail view of the valve stem engaging member.
Figure 8:
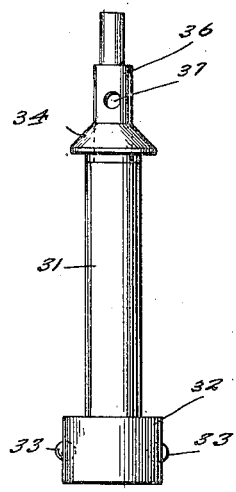
Figure 8 is a view in elevation of the signal proper.

The apparatus forming the subject matter of the present invention includes a tubular body portion 16 of hollow formation and formed to provide step shoulders arranged interiorly thereof and indicated at 17 and 18 respectively. The tubular body portion 16 is threaded on the tubular extension 15 as clearly illustrated in Figures 2 and 3, and receives the projected portion of the valve casing 11. Operating in the body portion of the apparatus is a spring pressed plunger which is held against the exposed end of the valve casing 11 as illustrated in Figures 2 and 3 by means of the coil spring 19. This spring has one end bearing against the shoulder 17 and the opposite end bearing against the plunger above referred to. The plunger is made up of a plurality of associated parts including a cup shaped member 20, the under side of which reposes upon a disk 21, the disk is provided with a depending flange 22, the latter terminating in an inwardly directed flange 23, and this flange is provided to hold a yieldable disk 24 against the underside of the disk 21. The yieldable disk 24 contacts the upper end of the valve stem casing 11. Arranged within the cup shaped member 20 is an inverted container 25 having an opening 26 in the top thereof for a purpose to be hereinafter described. The bottom of the cup shaped member 20 is provided with an opening which registers with similar openings in the disks 21 and 24 respectively, and slidable in these openings is the lower portion of the valve stem engaging member indicated at 27. This member is of tubular formation, and provided with a dividing flange midway between the ends of the member, the component parts of the flange indicated at 28 reposing upon the bottom of the cup shaped member 20 as clearly shown. Consequently a portion of the member 27 is arranged within the container 25, and above this portion is arranged a coil spring 29. One end of this spring rests against the flange 28, when the upper end bears against the top of the container 25. The lower part of the member 27 is provided with a conical shaped opening 30 which receives the adjacent end of the valve stem 13, it being understood that the member 27 is always in contacting engagement with the adjacent end of said valve stem. The plunger in its entirety is held in contacting engagement with the adjacent end of the valve casing 11 by means of the spring 19, but the member 27 is susceptible of independent movement with relation to the plunger of which it forms a part, and is controlled in its movements to some extent by means of a spring 29.

Arranged in the upper part of the tubular body portion 16 of the signal is what may be termed the signal proper, the latter including a tubular body portion 31 which is enlarged at its lower end as at 32, this enlarged portion being provided with frictional rollers 33, the latter normally projecting beyond the sides of the enlarged portion and arranged beneath the shoulder 18 of the body 16 of the device. These frictional rollers are capable of being moved within the enlarged end portion 32 to arrange the signal, thereby moving upwardly above the upper end of the body portion 16 as shown in Figure 3. The upper end of the body portion of the signal 31 is provided with a whistle 34, the whistle having associated therewith a cap 35 which normally closes the upper end of the body 16 of the device, and thus prevents dirt, dust and other foreign matter from gaining access to the apparatus. The cap 35 is spaced from the reduced extremity 36 of the signal which is provided with openings 37 for the escape of air, the air passing from the cap between the depending flange 38 thereof and the conical shaped portion of the signal proper in the form of a whistle.

In practice, the body 16 of the device is associated with the valve stem casing 11 in the manner shown, and the spring 19 holds the plunger seated upon the upper end of the casing 11. The sliding member 26 as above stated constantly contacts the adjacent end of the valve stem 13, being held in this position by means of the spring 29. It is to be understood however, that the spring 29 is not very strong, so that the valve 12 remains seated, and is not in any way influenced by the spring 29 so long as the tire remains inflated above a predetermined degree of pressure. Again, in the normal position of the parts, the cap 35 reposes upon the upper end of the body 16, thus preventing dirt and dust from finding its way into the apparatus. Now, should the tire become deflated below a predetermined pressure, from any cause whatsoever, the spring 29 normally tensioned operates to depress the member 27, thereby opening the valve 12, and allowing whatever air remains in the tire to escape. The air as it leaves the valve casing 12 passes into the body portion 16 above the plunger through the longitudinal grooves 39 provided in the member 27, these grooves 39 intersecting the disks 28 and dividing the latter in a manner above described. To permit the air to pass through the body 16 in this manner, I provide the casing 25 and the spring 29 with an opening 26 in the top thereof. As the air enters the tubular body 16 above the plunger, the enlarged portion 32 of the signal presents a sufficient area for the air to operate against, so that the air pressure elevates the signal 31 to the position shown in Figure 3, during which time the cap 35 is elevated or spaced from the adjacent end of the body 16. The signal proper indicated at 31 is hollow, so that the air passes through this member, finding its way through the opening 37 into the cap 35, and finally escaping from the cap through the space contiguous to the conical shaped portion 34 of the signal producing a sound similar to a whistle. The signal thus informs the driver of the vehicle of the deflated condition of the tire, so that the same may be repaired before it becomes cut, or before serious damage is done to the inner tube which would obviously run on a deflated tire. The signal is very simple in construction and highly efficient in operation for the purpose intended.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What is claimed is:

1. A tire signal comprising a body member designed to receive the valve stem casing of a tire, a spring pressed plunger operating in the body member and held in contacting engagement with the adjacent end of said valve casing, a tubular member forming part of said plunger and susceptible of independent sliding movement, said tubular member engaging the valve stem, means automatically moving the tubular member in a direction to open the valve when the air in the tire reaches a predetermined low pressure, an audible signal mounted for sliding movement in said body member, a cap carried by said signal and normally closing the upper end of the body member, and said signal and cap being elevated and sounded by the escaping air from the tire subsequent to the opening of the valve for the purpose specified.

2. A tire signal comprising a body member adapted to receive the valve stem casing of a tire, a spring pressed plunger of hollow formation arranged within the body member and contacting the adjacent end of said casing, a tubular member mounted for sliding movement within the plunger and designed to engage the adjacent end of the valve, yieldable means arranged within the plunger and operating to move the tubular member in a direction to open the valve, when the air in the tire reaches a predetermined low pressure, said tubular member having longitudinal grooves to permit the air from the tire to enter the body member subsequent to the opening of the valve, an audible signal operating in the body member and including a hollow body portion having openings adjacent the upper end thereof, said member defining a whistle, operable by the passage of air therethrough, a cap carried by the signal member and normally closing the upper end of the body, and said signal being elevated by the pressure of air against the same to operate the cap from the body portion for the purpose specified.

In testimony whereof I affix my signature.

CHARLES LEO FITZ.